June 11, 1935.  W. H. FURNESS  2,004,572
POWER TRANSMISSION
Filed Aug. 15, 1934  2 Sheets-Sheet 1
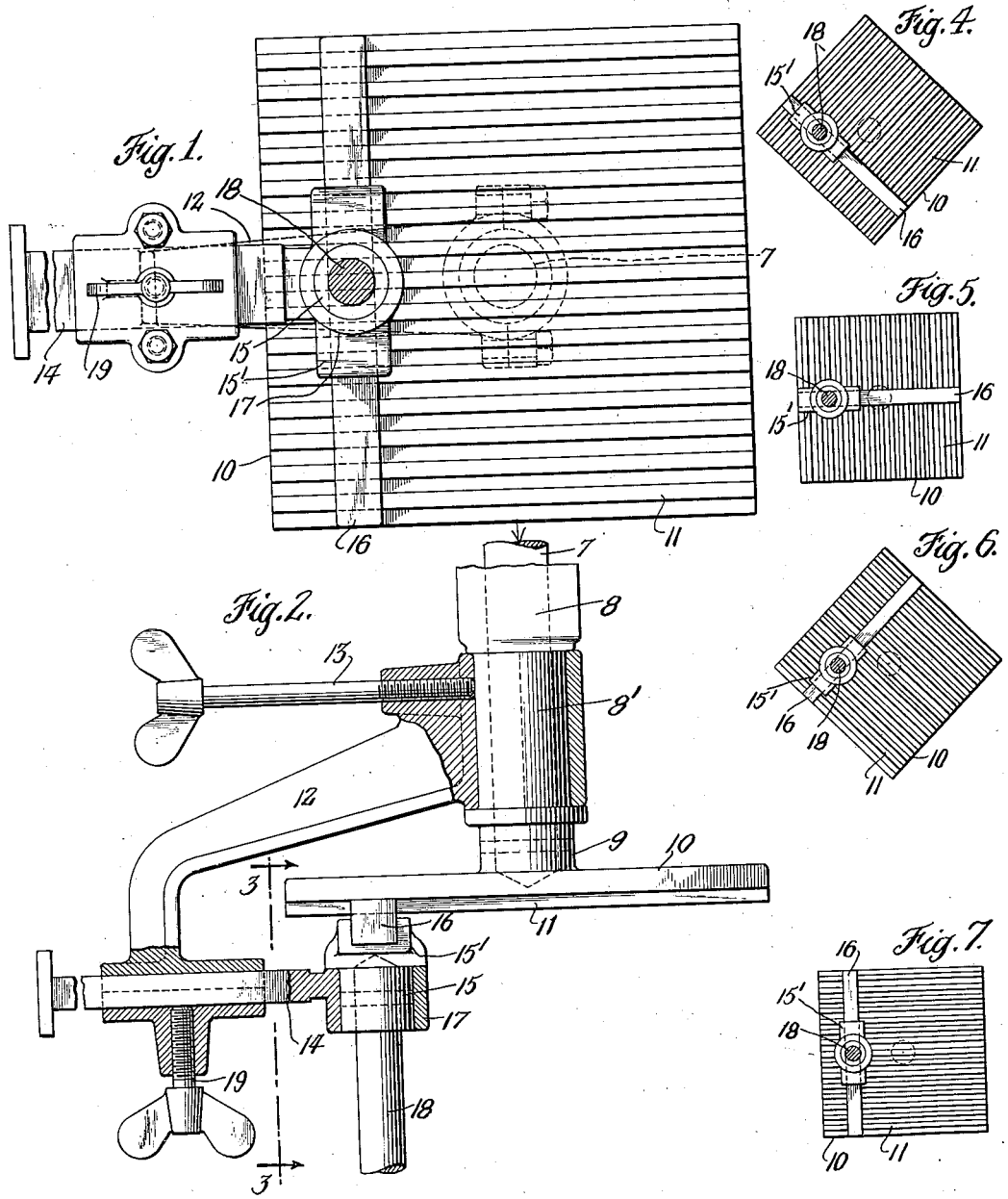
INVENTOR.
William H. Furness
BY
Synnestvedt & Lechner
ATTORNEYS June 11, 1935. W. H. FURNESS 2,004,572
POWER TRANSMISSION
Filed Aug. 15, 1934 2 Sheets-Sheet 2
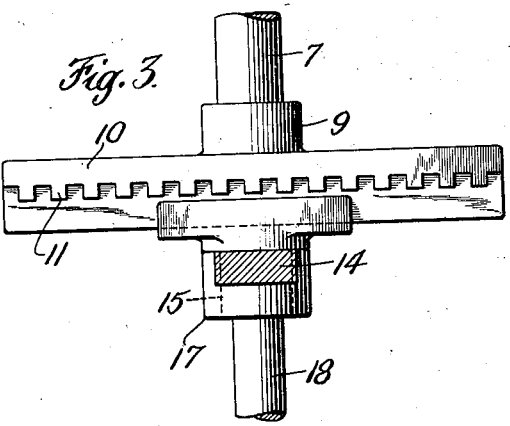
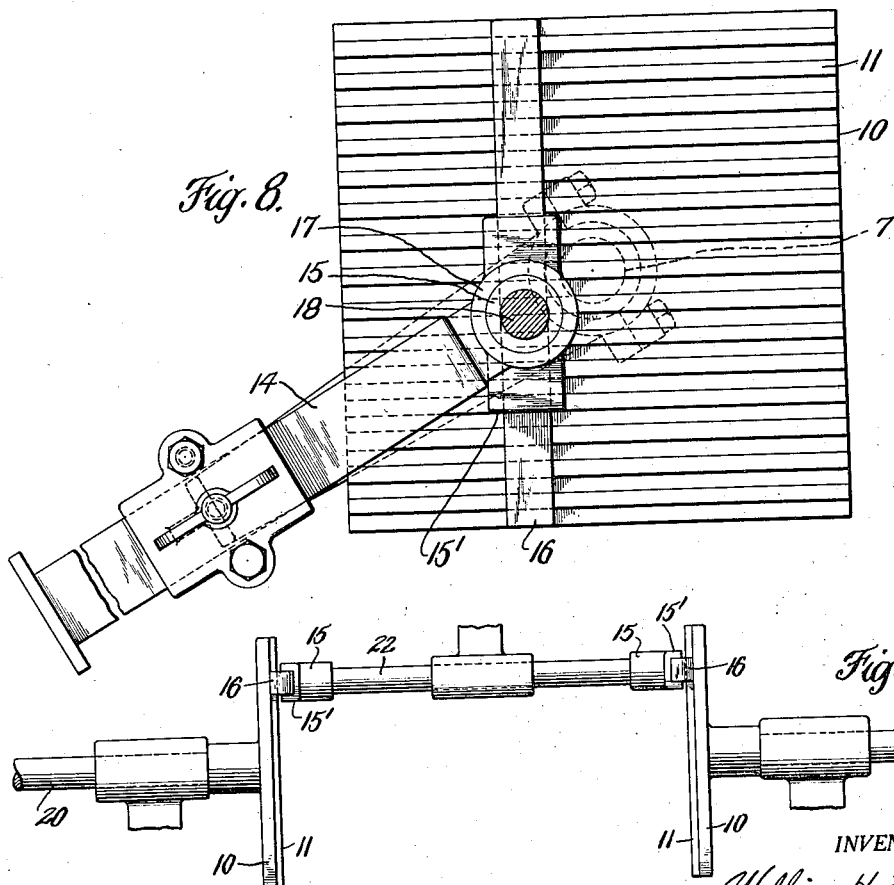
INVENTOR.
William H. Furness
BY
Synnestvedt & Lechner
ATTORNEYS Patented June 11, 1935

2,004,572

UNITED STATES PATENT OFFICE 2,004,572

POWER TRANSMISSION

William H. Furness, Riverton, N. J., assignor to American Rayon Company, Inc., Riverton, N. J., a corporation of New Jersey Application August 15, 1934, Serial No. 739,883

7 Claims. (Cl. 74—63)

This invention relates to power transmission devices and it has for its primary object the provision of a simple and economical transmission or drive capable of a very wide range of adjustment or accommodation, rendering it useful for a variety of purposes.

In Figures 1 to 8 inclusive of the drawings I have shown my invention as applied to a drill while in Figure 9 I have illustrated it as applied to line shafting.

Referring now to the drawings:

Figure 1 is a bottom plan view of a drill embodying my drive;

Figure 2 is a side elevation and partial section of the drill;

Figure 3 is a section taken on the line 3—3 of Figure 2;

Figures 4 to 7 inclusive are small scale diagrammatic views illustrating the manner in which the device operates;

Figure 8 is a view corresponding to Figure 1 but illustrating how the device may be adjusted; and Figure 9 is a view showing how the drive may be employed in line shafting.

On reference to Figures 1 and 2 it will be seen that the reference numeral 7 indicates a drive shaft having a suitable bearing 8. Pinned or otherwise secured to the end of the drive shaft 7 is a plate 10 provided with a boss 9 for this purpose. The plate 10 has a plurality of parallel teeth 11 running across the face thereof. These teeth are preferably square in cross section. Swiveled on the turned down portion 8' of the bearing 8 is an arm 12 which may be adjusted through 360° and secured in any position of adjustment as, for example, by the member 13. It will, of course, be understood that the bearing 8 is non-rotatable. The free end of the arm extends well beyond the plate 10 and has a bar 14 slidably mounted therein for movement toward and from the axis of rotation of the plate 10. The bar 14 has swiveled in its inner end the sleeve 15 having a yoke 15' adapted to slidably fit a rack bar 16 the teeth of which engage with the teeth 11 of the plate. The sleeve 15 is mounted in a socket 17 on the end of the bar 14 and a drill 18 is pinned or otherwise detachably secured to the sleeve 15. The position of the bar 14 is adjustably fixed by the member 19.

The operation of the device is as follows:

The drive shaft 7 is driven from any suitable source of power and as it rotates it causes the plate 10 to rotate therewith. The rack bar 16, of course, moves with the plate 10 as the latter rotates and, therefore, the angular position of the rack bar is constantly changing. To illustrate, in Figure 4 the plate 10 has been rotated 45° and the position of the bar will be as shown, in Figure 5 the plate has been rotated 90°, in Figure 6 it has been rotated 135° and in Figure 7 it has been rotated 180°. This will suffice to show how the rack bar is carried with the plate and has its angular position changed.

As this occurs, however, the yoke 15' slides on the bar 16, but since it engages the side faces of the bar 16, the yoke 15' is caused to rotate as the angular position of the bar changes. This imparts rotary movement to the drill 18, giving a one-to-one drive as between the drive shaft 7 and the drill 18.

It will be seen that the rack bar 16 may be adjusted to any position from near the edge of the plate all the way into the center and depending upon the length of the bar 14, all the way to near the opposite edge of the plate. The position of the drill 18 may, therefore, be changed in position in a direction lengthwise of the teeth 11. By loosening the member 13 and adjusting the arm 12 the position of the drill 18 can be changed through 360° annularly of the plate. (See Fig. 8.) I have thus provided a compound adjustment which will enable me to spot the drill 18 at any point over the entire central area of the plate 10. I thus have a very simple drive having an infinite capacity for adjustment within the limitations of size and no change or substitution in parts is required. The advantages of this in a drill will be readily appreciated by those skilled in the art.

It will also be noted that the drive is a reversible one and will give a one-to-one drive in the reverse direction irrespective of the position of the member 18 with reference to the center of the plate 10. Advantage of this feature of my invention may be taken in a number of ways as for example, in line shafting where it is desired to get around an obstruction such as a post or column or the like. I have illustrated this in Figure 9 wherein 20 and 21 are two lengths of shafting each having a plate 10 at adjacent ends. An offset shaft 22 has at each end a sleeve 15 with yoke 15' for slidably engaging the rack bars 16. A one-to-one drive between the shafts 20 and 21 is thus secured. I am aware that gear drives have been employed to get around obstructions but it will be noted that by my invention the same drive can be utilized in a variety of varying applications whereas with a gear drive a special set of parts would have to be provided for each peculiar set of conditions.

I claim:—

1. In a power transmission, a revoluble plate having parallel teeth extending in a direction across a face thereof, a rack bar engaging said teeth, and a revolubly mounted yoke slidably engaging the rack bar.

2. In a power transmission, a revoluble plate having parallel teeth extending in a direction across a face thereof, a rack bar engaging said teeth, a yoke slidably engaging the rack bar, and a mounting for the yoke adjustable with respect to the axis of rotation of the plate.

3. In a power transmission, a revoluble plate having parallel teeth extending in a direction across a face thereof, a rack bar engaging said teeth, a yoke slidably engaging the rack bar, and a mounting for the yoke adjustable radially with respect to the axis of rotation of the plate.

4. In a power transmission, a revoluble plate having parallel teeth extending in a direction across a face thereof, a rack bar engaging said teeth, a yoke slidably engaging the rack bar, and a mounting for the yoke adjustable circumferentially with respect to the axis of rotation of the plate.

5. In a power transmission, a revoluble plate having parallel teeth extending in a direction across a face thereof, a rack bar engaging said teeth, a yoke slidably engaging the rack bar, and a mounting for the yoke adjustable radially and circumferentially with respect to the axis of rotation of the plate.

6. In a power transmission, a shaft, a bearing for the shaft, a plate on the shaft having parallel teeth on a face thereof, a shoe engaging the teeth on said plate, an arm revolubly adjustably mounted on the bearing, a bar carried in the arm for adjustment toward and from the axis of rotation of the plate, and a member swivelled in the bar and slidably engaging the shoe, said member being adapted to non-rotatively receive another member.

7. In a power transmission, a pair of shafts, and a drive connection therebetween including a plate with parallel teeth, a rack bar engaging the teeth, and a yoke slidably engaging the bar and mounted for rotation.

WILLIAM H. FURNESS.